Patented Feb. 19, 1929.

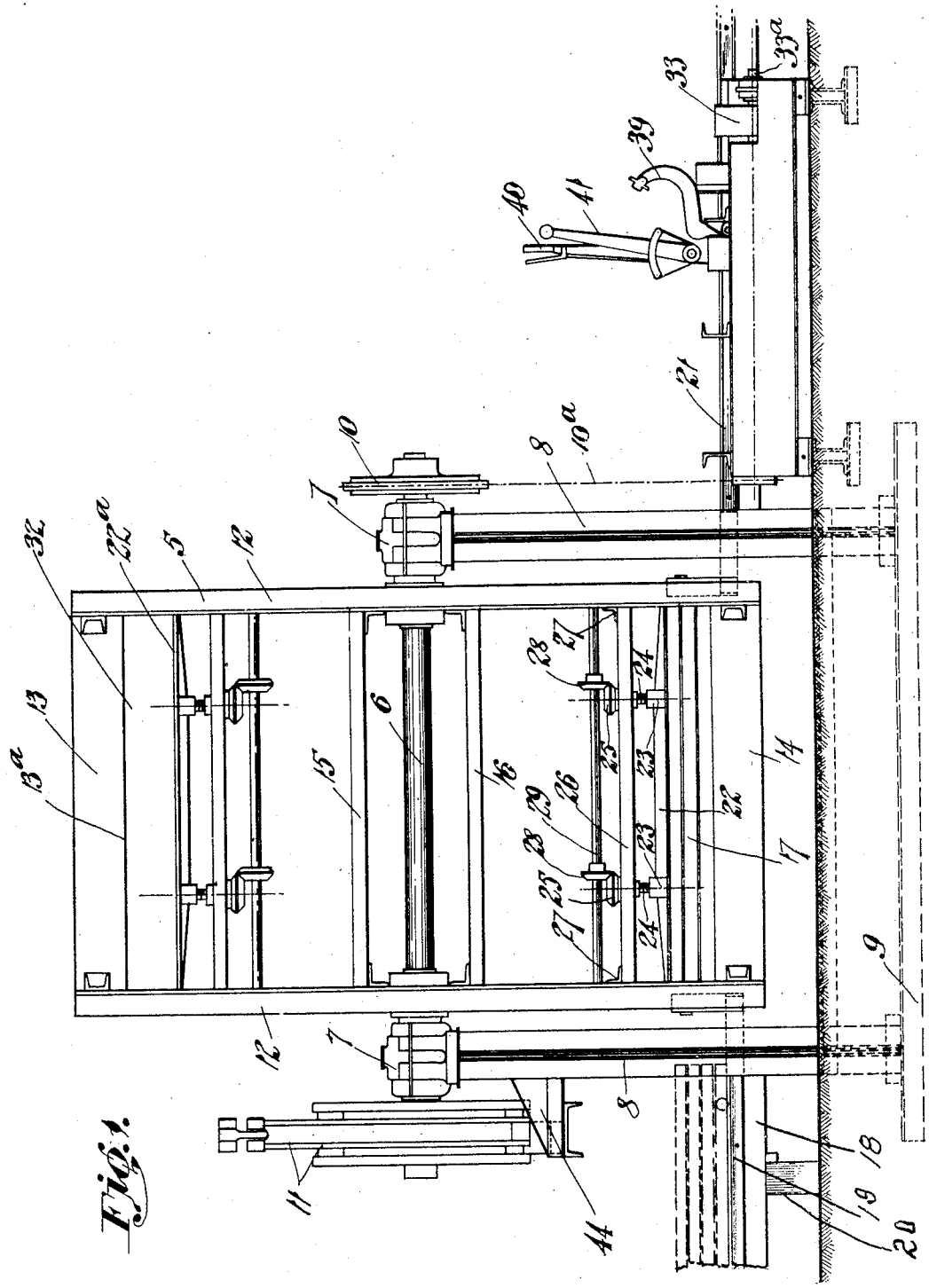

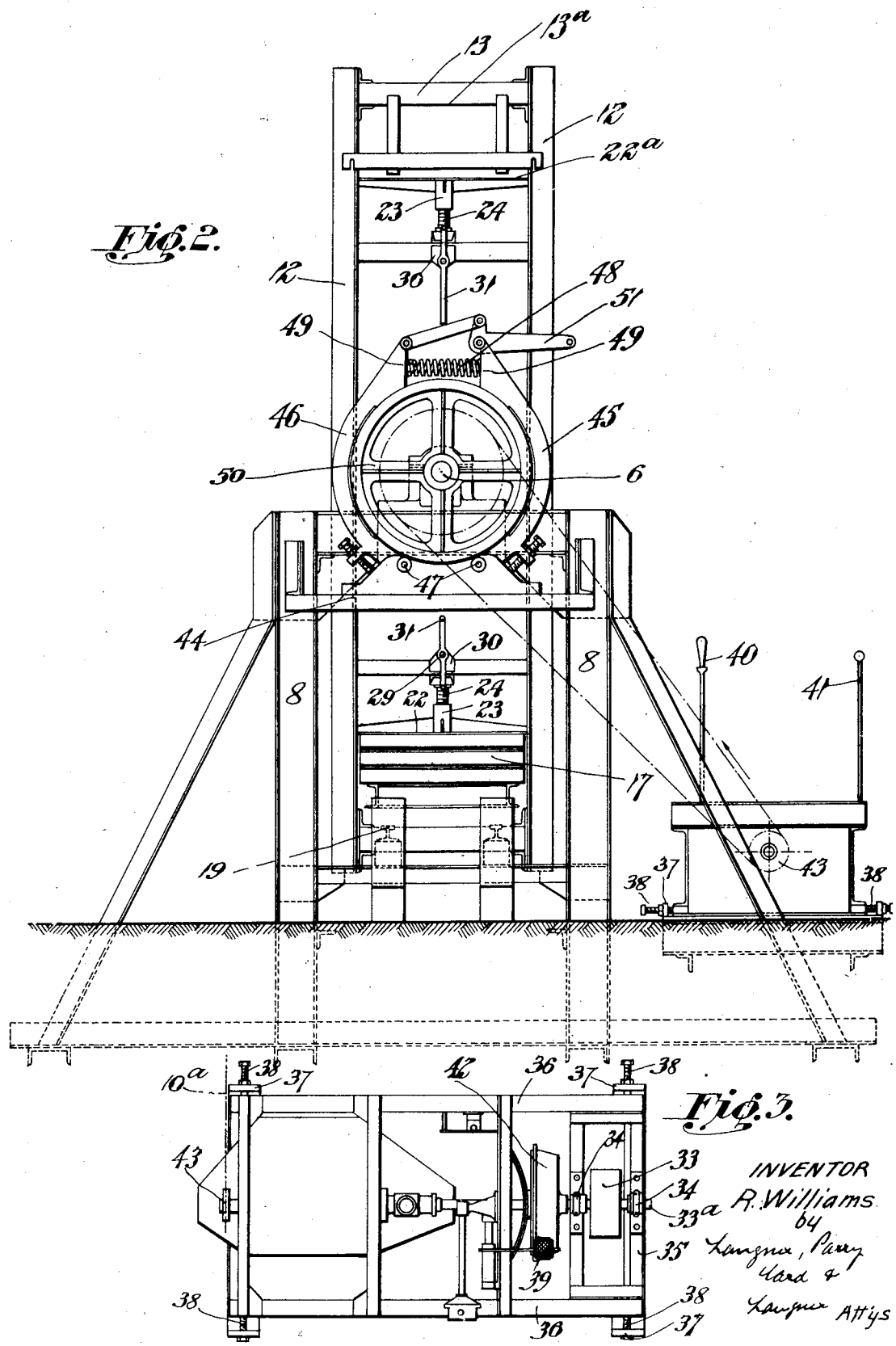

1,703,024

UNITED STATES PATENT OFFICE.

RALPH WILLIAMS, OF TOORAK, NEAR MELBOURNE, VICTORIA, AUSTRALIA.

APPARATUS FOR CENTRIFUGALLY MOLDING SOLID ARTICLES FROM PLASTIC MATERIAL.

Application filed May 19, 1927, Serial No. 192,758, and in Australia May 29, 1926.

This invention has reference to apparatus for centrifugally molding solid articles, such as slabs, blocks and the like, from plastic material, and is directed to a highly efficient apparatus whereby the shapes are expeditiously molded.

The basic principle underlying the invention consists in the use of a rotatable frame adapted to carry a plurality of removable molds which, when filled with plastic material, are slid into the said frame, the said frame being then caused to rotate upon its axis by suitable driving means, such rotation consolidating the plastic material within the molds and causing the said plastic to conform to the shape of said molds and after rotating for a specified time the frame is brought to rest and the molds, together with their burden, removed from the said frame, the said molds being immediately replaced by a fresh number awaiting treatment.

An essential feature of the invention consists in arranging and subjecting a plurality of trays each of which carries a supply of material and arranged in tiers to centrifugal force so that a plurality of shapes are formed simultaneously.

In order to more readily understand the invention reference will now be made to the accompanying drawings in which:—

Figure 1 is a view in front elevation showing apparatus constructed according to this invention.

Figure 2 is a view in end elevation of apparatus constructed according to this invention.

Figure 3 is a plan view of the clutch driving mechanism.

According to this invention a rotatable frame 5 is provided being preferably constructed from metal and is provided with a shaft 6 through its centre, said shaft 6 being supported by bearings 7 mounted upon pillars 8 suitably received upon a foundation 9 to impart the required rigidity to the structure.

On the said shaft 6, preferably at a position outside the bearings 7, is a pulley or sprocket wheel 10 and braking member 11, which is preferably of the band brake type.

The revolvable frame 5 described comprises spaced vertical members 12 which are retained in spaced relationship by means of transverse members 13, 14, 15 and 16.

The members 13 and 14 are disposed as shown particularly in Figure 1 and are adapted to receive the lowermost of a series of trays 17 which are filled with the plastic material from which it is desired to form the shape, such as a slab, block or the like.

The trays 17 are preferably filled at a position either adjacent to, or remote from, the molding machine, any suitable mixing machine serving the purpose, the said trays 17 when filled, or during the filling, being placed upon a trolley 18 adapted to move along rails 19 supported on bearers 20 and the arrangement of the rails 19 is such that the trays are slid from the filling means into the frame 5 and after molding the said molds 17 are slid from the frame 5 to the rails 21 on the opposite side of the machine to the rails 19, thus the operation is practically continuous.

The trays or molds 17 are arranged in the frame 5 in such a manner that the bottom of one tray forms the cover for the tray immediately above it, and when the required number of trays or molds are in position, they are clamped securely within the frame 5 by means of the clamping device shown and which comprises a plate 22 which acts as a cover for the uppermost tray, said plate being provided with bosses 23 receiving threaded members 24 moving in bevelled pinions 25 bearing against the transverse member 26 secured by means of angle plates 27 to the side members 12 of the frame 5, and engaging with the said bevelled pinions 25 are bevelled pinions 28 mounted upon a transverse spindle 29 supported in any suitable way as in bearings 30.

An essential feature consists in subjecting a plurality of trays, each of which carries a supply of material, arranged in tiers, to centrifugal force, so that plurality of shapes are formed simultaneously.

The plate 22 is raised or lowered out of or into engagement with the uppermost of the trays 17 by actuating the spindle 29 by means of the handle 31 and it will be obvious that upon rotating the said spindle 29, the bevel pinions 28 and 25 turn the threaded members 24 and accordingly raise or lower the plate 22.

When the trays or molds 17 are positioned as shown more particularly in Figure 1, the frame 5 may then be partially rotated in order to bring the end 32 opposite the rails 19, 21, when the trays may be then inserted into the position between the plate 22ª and the face 13ᵃ of the transverse member 13 when the trays 17 become arranged as previously described.

The frame 5 may be rotated from a shaft or countershaft, or it may be rotated through a separate means driven from a countershaft or shaft, in which case the belt from the shaft or countershaft would engage with a pulley 33 mounted on a shaft 33ᵃ supported in bearings 34 on the transverse members 35 of a frame 36 which may be manipulated so as to register with the pulley 10 of the frame 5 and also the frame 36 may be adjusted to regulate the tension on the belt or chain 10ᵃ, by mounting said frame 36 between plates 37 and disposing adjusting screws 38 so as to impinge against the sides of the frame 36, so that, upon forcing one side of the frame 36 over by means of the adjusting screws 38, or by any other arrangement of the said adjusting screws the frame 36 may be positioned as desired.

Operating in connection with the shaft 33ᵃ is a clutch release pedal 39, a band-brake 40 and gear change lever 41, the clutch member being of the usual friction clutch type and is disposed as shown at 42.

On the end of the shaft 33ᵃ opposite to the end of the pulley 33 is a driving pulley 43 which is adapted to receive in the case of a plain pulley, a belt, or the said pulley 43 may be a sprocket to receive a chain for driving the revolvable frame 5, and in the case of the chain or belt drive, the transmission will go direct to the pulley 10 or sprocket.

As considerable motion is involved when the frame 5 is rotating, extra braking means are employed for bringing the frame 5 to a state of rest, and this means consisting in mounting upon the shaft 6 a band brake member 11 as previously described, which is carried on an extension 44 secured to the pillar 8, the closing members 45, 46 of the brake being pivoted as at 47 to a member mounted upon the extension 44.

A spring 48 is disposed between the cheeks 49 of the closing members 45 to normally maintain the said members 45 out of engagement with the revolving member 50.

Link devices are combined with the closing members 45—46 and the one link device 51 is extended and formed to receive a rod or other means which will permit the operator closing the members 45 upon the rotating member 50 when it is desired to slow down or stop the motion of the frame 5.

In carrying the invention into practical effect the trays or molds 17 are filled at a position remote from, or adjacent to, the apparatus and the said molds 17 are preferably arranged upon a trolley device as 18 which is adapted to move upon the rails 19, 21.

The trays or molds 17 being filled with plastic material are now slid into the position between the plate 22 and member 14 or plate 22ᵃ and member 13, according to the position the frame takes in relation to the rails 19, 21 and when the molds 17 are in position, they are clamped securely by means of the plate 22 which is raised or lowered by means of the bevel pinions 25, 28 actuated by the belt spindle 29 by means of the operating handles 31.

The closing members 45 of the band brake member 11 being free from the rotating member 50 and the clutch mechanism already described being operated, the frame 5 is slowly caused to rotate and as the velocity of the said frame increases, the clutch members may be finally positioned, thus permitting the requisite velocity being obtained by the frame 5 in order to consolidate the plastic material in the mold 17 so as to cause the said plastic material to conform to the shape of the said molds 17.

After the required period of rotation has occurred, the clutch mechanism is operated to bring it to the neutral position, thus permitting the frame 5 to revolve by its own momentum, when the operator causes the closing members 45, 46 to tightly engage with the rotating member 50 and by adjusting the pressure upon the extending link member 51, the frame 5 may be caused to become stationary at a position so as to register the trays or molds 17 with the outgoing rails 21 and when the space previously occupied by the trays or molds 17 has become vacant, fresh trays or molds are ready on the rails 19 to be slid into and occupy the said space by the trays or molds recently withdrawn onto the rails 21.

The frame 5 is then partially rotated which brings the opposite series of trays or molds 17 opposite to the rails 19, 21 when the plate 22ᵃ is released from engagement from the uppermost of the series of trays, permitting them being slid outwardly onto the rails 21 whilst an incoming series of trays or molds 17 are now ready upon the rails 19 to be slid into the unoccupied space between the plate 22ᵃ and member 13, and upon clamping down the plate 22ᵃ onto the trays or molds 17 clutch mechanism may be operated and the frame 5 rotated as previously described.

It will be seen by the particular arrangement of filling the trays ready to slide into the frame 5, by withdrawing one lot of molds and replacing them by a new lot of molds, that the minimum time is required within which to mold solid articles of any shape, and it will be obvious that articles molded in this way will consolidate far more quickly than when molded in ordinary molds without the said centrifugal pressure and the definition of the resultant product will be infinitely better than products obtained hitherto.

I do not wish to limit myself to the use of the clutch mechanism described nor to the speed control and band brake mechanism mounted upon the frame member 36, as I may use an ordinary countershaft driven from a driving shaft in which the countershaft comprises the well known fast and loose pulley for throwing the frame 5 into and out of gear.

In the event of only using one end of the frame 5 for receiving molds 17 balance weights would be positioned at the opposite end of the frame and in order to compensate for different weights of articles being molded the compensating weights would be variable.

What I claim as my invention and desire to secure by Letters Patent is—

1. Apparatus for the purposes specified comprising a rotatable frame supported upon a central axis, said frame being adapted to receive slidable trays or molds carrying plastic material, means for holding the trays or molds in position within the frame, means for rotating said frame, means for sliding molds into and out of the frame and means for bringing the frame into a state of rest.

2. Apparatus for the purposes specified, characterized by mounting a frame upon a central shaft carried in bearings mounted upon pillars, said frame comprising members spaced apart and adapted to receive slidable trays or molds, the shaft of said frame carrying a pulley or sprocket at one end and a band brake at the other end, rails disposed at each side of said frame and adapted to register with a space between a transverse member and a movable plate, clutch mechanism, speed change mechanism and a band brake disposed adjacent the said frame, a driving pulley or sprocket disposed adjacent the said frame and in line with a pulley or sprocket on the shaft of the said frame, for the purposes specified.

3. Apparatus for the purposes specified, a rotatable frame, a plurality of removable molds on said frame, the molds being adapted to slide into position, means for rotating the frame upon its axis in such a manner that the plastice material is consolidated within the molds and caused to conform to the shape of the said molds.

Signed at Melbourne, Victoria, Australia, this 8th day of April, 1927.

RALPH WILLIAMS.